G. W. TEASDALE.
SINKER.
APPLICATION FILED NOV. 27, 1908.

942,597.

Patented Dec. 7, 1909.

WITNESSES
F. F. Sweet
W. Harrison

INVENTOR
George W. Teasdale
BY Munn & Co.
ATTORNEYS

UNITED STATES PATENT OFFICE.

GEORGE WALTER TEASDALE, OF NEW YORK, N. Y., ASSIGNOR OF ONE-HALF TO FREDERICK H. PLATE, OF BROOKLYN, NEW YORK.

SINKER.

942,597. Specification of Letters Patent. Patented Dec. 7, 1909.

Application filed November 27, 1908. Serial No. 464,775.

*To all whom it may concern:*

Be it known that I, GEORGE WALTER TEASDALE, a citizen of the United States, and a resident of the city of New York, borough of Brooklyn, in the county of Kings and State of New York, have invented a new and Improved Sinker, of which the following is a full, clear, and exact description.

My invention relates to sinkers admitting of general use, and particularly to the type of sinker used in connection with a line for purposes of fishing.

Reference is to be had to the accompanying drawings forming a part of this specification, in which similar characters of reference indicate corresponding parts in all the figures.

Figure 1:
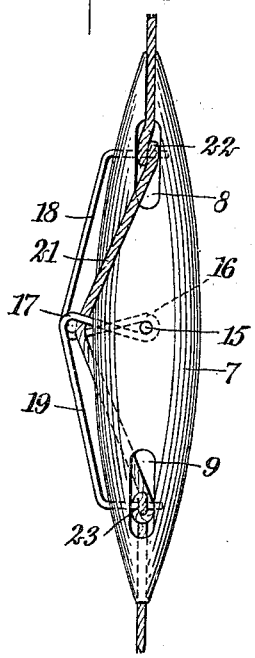
Figure 2:
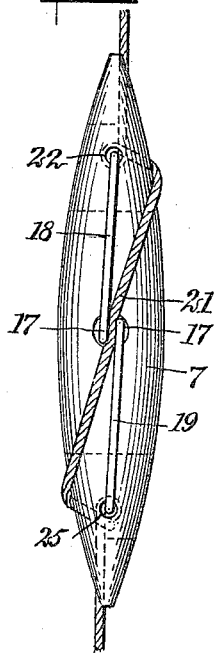
Figure 3:
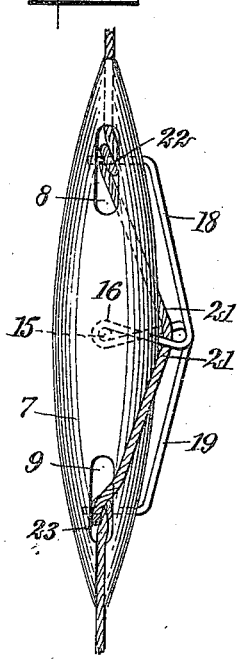
Figure 4:
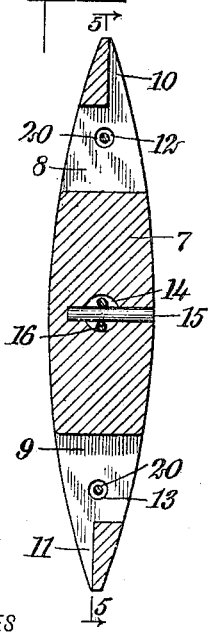
Figure 5:
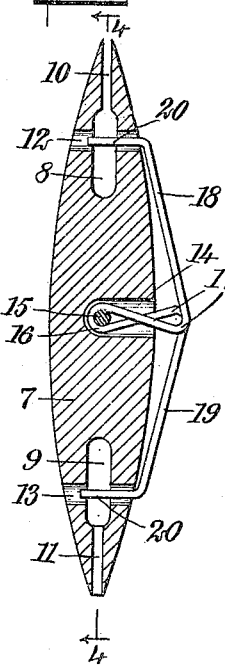
Figure 6:
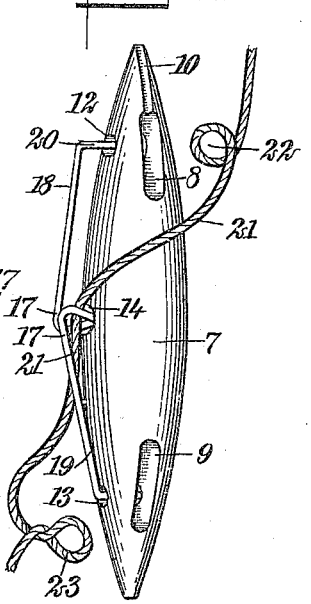

Figure 1 is a plan view of the sinker complete, showing one way in which it may be mounted upon a line; Fig. 2 is a plan view of the sinker, showing it turned to a right angle from its position indicated in Fig. 1; and Fig. 3 is a view somewhat similar to Fig. 1, but showing the sinker as it appears upon the opposite side; Fig. 4 is a longitudinal section on the line 4—4 of Fig. 5, looking in the direction of the arrows, throughout the entire length of the sinker and showing the various slots; Fig. 5 is a section upon the line 5—5 of Fig. 4, looking in the direction of the arrows, and showing how the spring wire is mounted in position; and Fig. 6 is a perspective showing the sinker complete and a fishing line partially connected to the same.

A body portion 7 of heavy metal, preferably lead, is provided at its ends with large slots 8, 9, and merging into these are smaller slots 10, 11. Holes 12, 13 extend entirely through the body portion and are disposed near the ends thereof, these holes crossing the general plane of the slots 8, 9. The body portion 7 is provided near its middle with a hole 14 and extending diametrically through this hole at a point adjacent to its bottom is a pin 15. A spring wire 16 is bent around this pin and extends outwardly from the center of the body portion. The spring wire 16 is provided with bends 17 and with straight portions 18, 19, terminating in inwardly bent portions 20 which extend into the holes 12, 12, as will be understood from Figs. 4, 5. A line is shown at 21 and may be bent into loops 22, 23, as indicated in Figs. 1, 2, 3 and 6. A convenient way of connecting the line with the sinker is to force the line intermediate the bends 17, and then loop the line, as at 22 or as at 23 (Fig. 6), as desired, the loops being passed into the slots 8, 9. The ends 20 are next pulled outwardly so as to accommodate the loops and are allowed to spring inwardly through the loops, holding the line firmly in position.

I do not limit myself to any particular style of loop, such as 22 or 23, with which the line may be provided. Neither do I limit myself to the exact construction shown for the body portion 7 or of the spring member 16 connected with it.

Having thus described my invention, I claim as new and desire to secure by Letters Patent:

1. A sinker, comprising a body portion provided adjacent to its ends with slots and with holes extending into said slots, and a member of spring wire mounted upon said body portion and provided with portions extending into said holes for the purpose of holding a line within said slots.

2. A sinker, comprising a body portion provided adjacent to one of its ends with a slot, and further provided with a hole merging into said slot, and a member of spring metal connected with said body portion and provided with a portion bent inwardly and extending into said hole for the purpose of holding a line within said slot.

3. A sinker, comprising a body portion of metal provided adjacent to its ends with slots, a member of spring metal secured to said body portion and bent toward the ends thereof, said member of spring metal being provided with portions extending through said slots for the purpose of holding a line therein.

4. A sinker, comprising a heavy body portion provided with a hole disposed adjacent to its middle and with slots in its ends, a spring wire connected with said body portion and extending from said hole, said spring wire being provided with portions overlapping each other for the purpose of engaging a cord, said spring wire being further provided with portions extending from said hole and bent transversely into said slots for the purpose of engaging portions of a line extending through said slots.

5. A sinker, comprising a heavy body portion provided adjacent to its middle with holes, and adjacent to its ends with other holes, a pin extending into one of said holes adjacent to the middle of said body portion, a spring wire mounted upon said pin and extending from another of said holes adjacent to the middle of said body portion, said spring wire being provided with portions overlapping each other, and adapted to press upon a cord, said portions extending toward the ends of said body portion into the holes adjacent to said ends.

6. A sinker comprising a body portion provided adjacent to its ends with slots for holding a cord, and a spring wire mounted upon said body portion and provided with portions extending into said slots for the purpose of gripping said cord therein.

In testimony whereof I have signed my name to this specification in the presence of two subscribing witnesses.

GEORGE WALTER TEASDALE. [L. S.]

Witnesses:
R. W. SHELTER,
JOHN H. DOLL.